(12) United States Patent
Hineno et al.

(10) Patent No.: US 8,235,852 B2
(45) Date of Patent: Aug. 7, 2012

(54) POWER TRANSMISSION BELT

(75) Inventors: Yorifumi Hineno, Kobe (JP); Takayuki Utsumi, Himeji (JP); Takeshi Nishiyama, Kakogawa (JP)

(73) Assignee: Mitsuboshi Belting Ltd. (JP)

( * ) Notice: Subject to any disclaimer, the term of this patent is extended or adjusted under 35 U.S.C. 154(b) by 552 days.

(21) Appl. No.: 12/384,575

(22) Filed: Apr. 7, 2009

(65) Prior Publication Data
US 2009/0298633 A1 Dec. 3, 2009

(30) Foreign Application Priority Data

May 30, 2008 (JP) .................. 2008-143343

(51) Int. Cl.
F16G 5/00 (2006.01)
(52) U.S. Cl. ....................................... 474/263
(58) Field of Classification Search .................. 474/263, 474/265, 237
See application file for complete search history.

(56) References Cited

U.S. PATENT DOCUMENTS

| | | | |
|---|---|---|---|
| 4,747,812 A * | 5/1988 | Matsuoka et al. | 474/252 |
| 5,120,281 A * | 6/1992 | Mishima et al. | 474/263 |
| 5,413,538 A * | 5/1995 | Mishima | 474/263 |
| 5,427,637 A * | 6/1995 | Mishima et al. | 156/137 |
| 5,498,212 A * | 3/1996 | Kumazaki | 474/263 |
| 6,313,210 B1 * | 11/2001 | Lin et al. | 524/492 |
| 6,669,592 B2 * | 12/2003 | Hayashi | 474/268 |
| 7,137,918 B2 * | 11/2006 | Nonnast et al. | 474/260 |
| 7,485,060 B2 * | 2/2009 | Hineno et al. | 474/263 |
| 2002/0004434 A1 * | 1/2002 | Tani et al. | 474/263 |
| 2007/0249452 A1 * | 10/2007 | South | 474/263 |
| 2010/0203994 A1 * | 8/2010 | Fujikawa et al. | 474/263 |
| 2010/0298079 A1 * | 11/2010 | Shiriike et al. | 474/238 |

FOREIGN PATENT DOCUMENTS

JP    3440288 B2    10/2001

* cited by examiner

*Primary Examiner* — Thomas B Will
*Assistant Examiner* — Joan Misa
(74) *Attorney, Agent, or Firm* — Wood, Phillips, Katz, Clark & Mortimer

(57) ABSTRACT

A power transmission belt having a body with a rubber layer defining spaced friction drive surfaces at laterally oppositely facing side surfaces. Short reinforcing fibers are embedded in the rubber layer in an amount of 15-50 parts by weight per 100 weight percent of rubber in the rubber layer. The short reinforcing fibers include polyamide short reinforcing fibers that make up at least 50 weight percent of the short reinforcing fibers embedded in the rubber layer. A plurality of the polyamide short reinforcing fibers project from the friction drive surfaces and have exposed, flattened ends. Flat particles of inorganic powder are adhered to the friction drive surfaces to reside captively between the flattened ends of the polyamide short reinforcing fibers and locations on the friction drive surfaces at which the short reinforcing fibers do not project.

19 Claims, 2 Drawing Sheets

POWER TRANSMISSION BELT

BACKGROUND OF THE INVENTION

1. Field of the Invention

This invention relates to power transmission belts with at least one friction drive surface and, more particularly, to a power transmission belt having short reinforcing fibers that project from the at least one friction drive surface.

2. Background Art

Modern automobile engines are designed to allow quick changes in rotational torque, thereby to improve fuel efficiency, power, and other performance characteristics. As a result, heavy loading may be applied to a power transmission belt, typically with a V-ribbed construction, that cooperates with engine accessories. Heavy loading on such belts tends to generate stick-slip noise. This noise may be intensified when the belt gets wet, as when exposed to environmental water, or the like.

It is common to paint pulleys used with belts in the above types of systems to prevent rust formation, as before the automobile is delivered to a user. The paint is typically weakly adhered and is intended to fall off, as during simple idling, in a relatively short period that may be on the order of twenty to thirty minutes. This paint may not completely fall off of the pulleys after such limited operation. Any residual paint on the pulleys tends to become sticky at high temperatures. This condition may be the cause of additional stick-slip noise generation between the cooperating pulleys and belt.

Various approaches have been taken to avoid stick-slip noise generation by producing a belt with a low coefficient of friction between the belt and cooperating pulley surfaces. In Japanese Utility Model Publication No. 31006/1995, short reinforcing fibers are embedded in the compression section of a belt and project from the friction drive surfaces thereon. A powder viscosity depressant, such as talc, is applied so as to substantially entirely cover the projecting parts of the fibers.

While this approach reduces the frictional coefficient between the friction drive surfaces and pulleys due to the coverage of the projecting parts of the reinforcing fiber by the talc, the talc has a tendency to fall off as the belt is operated. Thus, the benefits of the talc may be realized for only a relatively short time period.

As an alternative approach, as disclosed in Japanese Patent No. 3440288, a powder surfactant is rubbed onto friction drive surfaces where they contact cooperating pulleys.

SUMMARY OF THE INVENTION

In one form, the invention is directed to a power transmission belt having a body with a length, an inside, an outside, and laterally oppositely facing side surfaces. The body includes at least one embedded load carrying member that extends lengthwise of the body. The body has a rubber layer defining at least a part of at least one friction drive surface. Short reinforcing fibers are embedded in the rubber layer in an amount of 15-50 parts by weight of the short reinforcing fibers per 100 weight percent of rubber in the rubber layer. The short reinforcing fibers include polyamide short reinforcing fibers that make up at least 50 weight percent of the short reinforcing fibers embedded in the rubber layer. A plurality of the polyamide short reinforcing fibers project from the at least part of the at least one friction drive surface and have exposed ends that are flattened. Flat particles of inorganic powder with a specific surface area of 5,000-25,000 cm$^2$/g are adhered to the at least part of the at least one friction drive surface at locations on the at least part of the at least one friction drive surface at which the short reinforcing fibers do not project.

In one form, the body has a compression section and a tension section and the rubber layer defines at least a part of the compression section.

In one form, the at least one friction drive surface consists of separate friction drive surfaces at the laterally oppositely facing side surfaces on the body.

In one form, the polyamide short reinforcing fibers project from the friction drive surfaces a distance of at least 30 μm.

In one form, the flat particles of inorganic powder have an apparent density of between 0.25 and 0.65 g/ml.

In one form, the flat particles of inorganic powder have an oil absorption of not more than 40 ml/100 g.

In one form, the flat particles of inorganic powder are made of talc and are captive between the flattened ends of the polyamide short reinforcing fibers and the locations on the at least part of the at least one friction drive surface at which the short reinforcing fibers do not project.

In one form, the talc does not have impurities including at least any of: a) iron oxide; b) aluminum oxide; and c) magnesium carbonate that collectively exceed 10 weight percent.

In one form, the power transmission belt is a V-ribbed belt.

In one form, the short reinforcing fibers include at least one of cotton and aramid fibers.

In one form, the polyamide short reinforcing fibers project from the friction drive surface a distance of 60-90 μm.

In one form, the friction drive surfaces defined by the rubber layer each has an area and the inorganic powder covers from 40-90% of the areas of the friction drive surfaces defined by the rubber layer.

In one form, the polyamide short reinforcing fibers make up from 75 to 100 weight percent of the short reinforcing fibers.

The invention is further directed to a power transmission belt having a body with a length, an inside, an outside, and laterally oppositely facing side surfaces. The body includes a rubber layer defining spaced friction drive surfaces at the laterally oppositely facing side surfaces. Short reinforcing fibers are embedded in the rubber layer in an amount of 15-50 parts by weight of the short reinforcing fibers per 100 weight percent of rubber in the rubber layer. The short reinforcing fibers include polyamide short reinforcing fibers that make up at least 50 weight percent of the short reinforcing fibers embedded in the rubber layer. A plurality of the polyamide short reinforcing fibers project from the friction drive surfaces and have exposed ends that are flattened. Flat particles of inorganic powder are adhered to the friction drive surfaces at locations on the friction drive surfaces at which the short reinforcing fibers do not project to reside captively between the flattened ends of the polyamide short reinforcing fibers and the locations on the friction drive surfaces at which the short reinforcing fibers do not project.

In one form, the adhered flat particles of inorganic powder have a specific surface area of 5,000-25,000 cm$^2$/g.

DETAILED DESCRIPTION OF THE INVENTION

Figure 1:
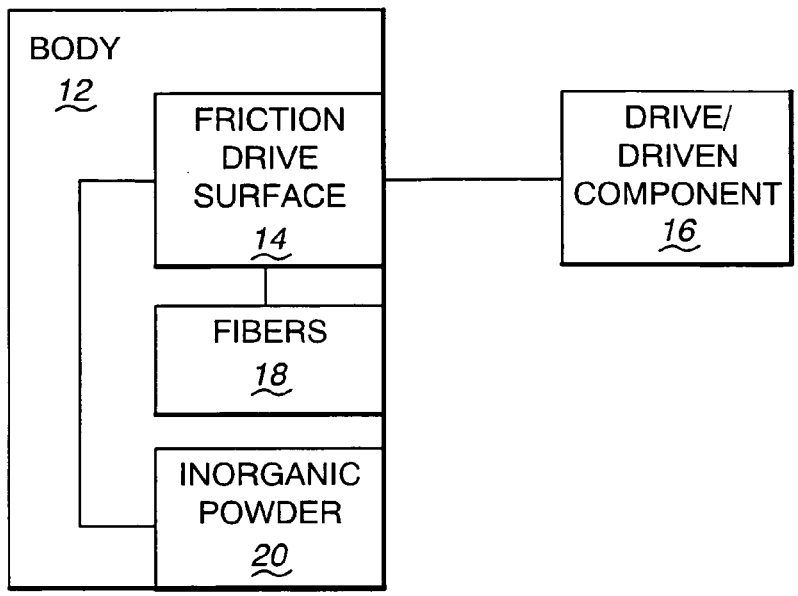
FIG. 1 is a schematic representation of a power transmission belt, made according to the present invention.

In FIG. 1, a power transmission belt, made according to the present invention, is shown schematically at 10. The belt 10 consists of a body 12 with at least one friction drive surface 14 that cooperates with a drive/driven component 16, typically in the form of a pulley. Reinforcing fibers 18 are embedded in the belt body 12, project through the drive surface 14 and have ends that are exposed and flattened through the manufacturing process. An inorganic powder 20 is adhered to the friction drive surface 14 at locations at which the fibers 18 do not project.

The belt 10 is shown schematically since it is intended to encompass virtually a limitless number of different belt configurations. The inventive concepts can be practiced with virtually all such different configurations, with one exemplary form described hereinbelow.

Figure 2:
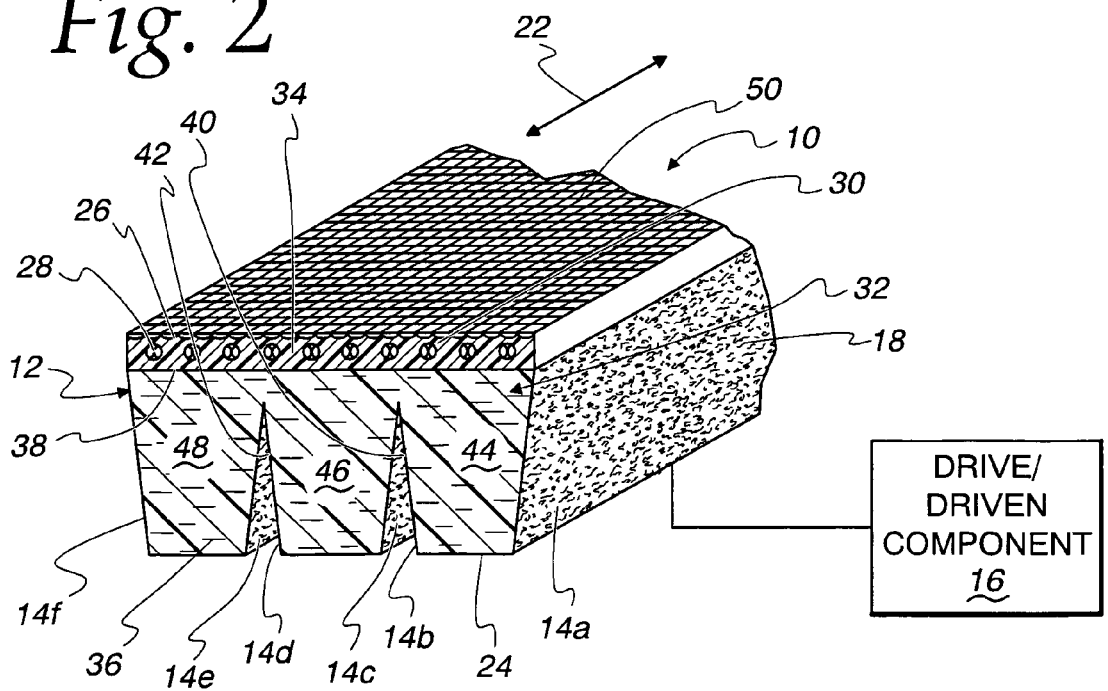
FIG. 2 is a partially schematic, fragmentary, cross-sectional perspective view of one specific form of belt, as shown in FIG. 1.
Figure 3:
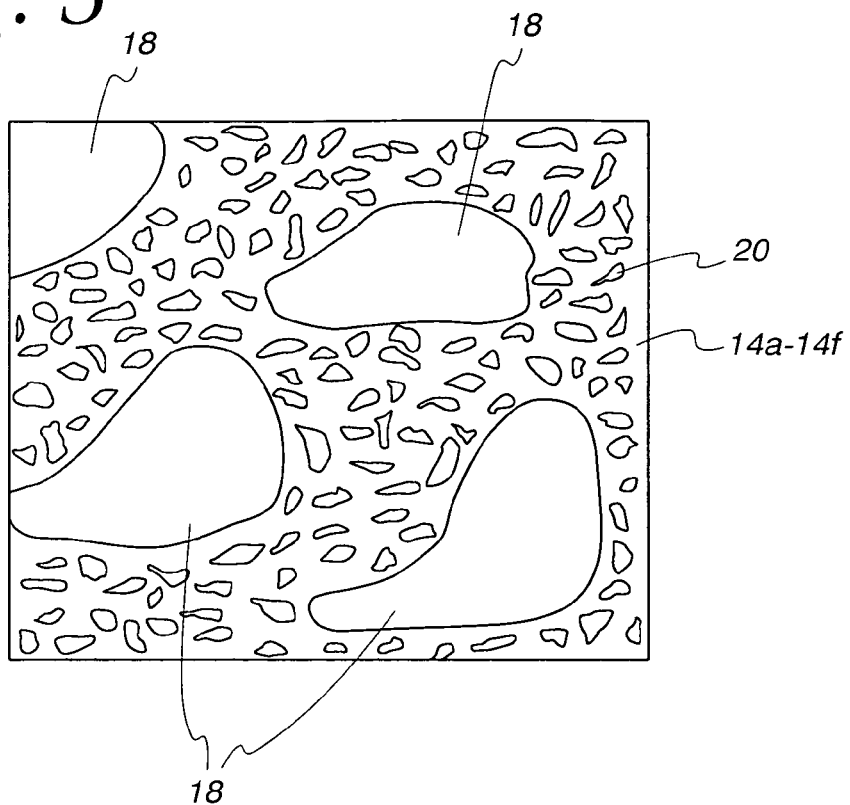
FIG. 3 is an enlarged, fragmentary view of the friction drive surface on the belt in FIG. 2.

In FIGS. 2 and 3, the power transmission belt 10 is shown as a V-ribbed belt with the body 12 having friction drive surfaces 14a, 14b, 14c, 14d, 14e, 14f that cooperate with complementary surfaces (not shown) on the drive/driven component 16. The embedded reinforcing fibers 18 project from the friction drive surfaces 14a-14f, with the inorganic powders 20 adhered to the surfaces 14a-14f at locations on the surfaces 14a-14f at which the reinforcing fibers 18 do not project.

More particularly, the body 12 has a length, as indicated by the double-headed arrow 22, an inside 24, and an outside 26.

The body 12 incorporates at least one load carrying member 28, in the form of at least one cord with laterally spaced lengths thereof. The load carrying cords 28 define the belt neutral axis. The body has a tension section 30 outside of the neutral axis and a compression section 32 inside of the neutral axis.

The load carrying cords 28 are embedded in a rubber layer 34. A compression rubber layer 36 is formed on the inside 38 of the rubber layer 34.

V-shaped grooves 40, 42 are formed through the compression rubber layer 36, thereby to define, in this case, three truncated, V-shaped ribs 44, 46, 48. The rib 44 has laterally oppositely facing friction drive surfaces 14a, 14b, with the rib 46 having corresponding surfaces 14c, 14d, and the rib 48 corresponding surfaces 14e, 14f.

A canvas layer 50 is applied to the outside 26 of the body 12.

The load carrying cords 28 are made from fibers, such as polyester, aramid and/or glass, to have a high strength, low elasticity construction.

The compression rubber layer 36 is an elastic layer that is produced by adding short, staple, fibers 18, such as polyamide fiber, cotton fiber, aramid fiber, etc. The polyamide fiber may be, for example, nylon 6,6 and nylon 6, 10. The fibers 18 are preferably present in the compression rubber layer 36 in an amount of 15-50 parts by weight per 100 parts by weight of the rubber. More preferably, this quantity is 15-25 parts by weight per 100 parts by weight of the rubber.

Polyamide fiber preferably makes up 50 weight percent of the entire amount of the short, staple fiber 18 in the compression rubber layer 36. More preferably, the polyamide fiber is present in an amount from 75-100 weight percent of the entire amount of staple fiber 18 in the compression rubber layer 36.

In the event that the total embedded fiber content is less than 15 parts by weight, the degree of projection of the fibers 18 from the friction drive surfaces 14a-14f may be relatively small. In this case, while the durability of the belt may not be significantly adversely affected, noise suppression may be less than desirable.

On the other hand, when the content of the fibers 18 exceeds 50 parts by weight in the compression rubber layer 36, there is generally adequate noise suppression, however, the fibers 18 may tend to fall off the rubber in the compression rubber layer 36 due to excessive rigidity in the rubber that results. Cracks are likely to generate prematurely in the ribs 44, 46, 48.

Preferably, the polyamide fibers 18 have lengths in the range of 1-5 mm, and more preferably 2-4 mm. Preferably, the polyamide fibers 18 project at least 30 μm. More preferably, the projection is in the range of 60-90 μm. The projecting ends of the polyamide fibers 18 are flattened at the friction drive surfaces 14a-14f. At locations where the short reinforcing fibers 18 do not project, flat particles of the inorganic powder 20 are adhered. The flattened, projecting ends of the polyamide fibers 18 embrace/capture the flat particles of the powder 20 against the surfaces 14a-14f. As a result, the particles of inorganic powder 20 may be maintained at the friction drive surfaces 14a-14f for a substantial time period during which they act as a lubricant to contribute to the suppression of noise resulting from the stick-slip condition. The powder 20 also repels water between projecting fibers 18 to control noise that would otherwise be generated by the water.

Preferably, the particles of the inorganic powder 20 are dispersed uniformly on the friction drive surfaces 14a-14f over from 40-90 percent of the exposed area of the surfaces 14a-14f.

The ribs 44, 46, 48 are preferably formed by a polishing procedure. More particularly, the ribs 44, 46, 48 may be formed by using a dry grinder wheel with a grinding surface to which 80-200 mesh diamond is attached.

Figure 4:
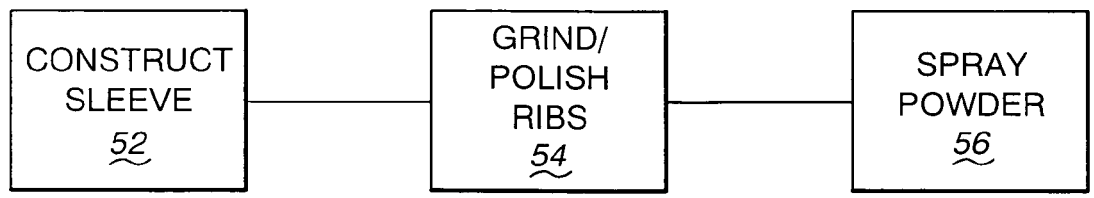
FIG. 4 is a flow diagram representation of a method of applying inorganic powder particles to friction drive surfaces on the belt in FIGS. 1-3, according to the invention.

As shown in FIG. 4, to construct the power transmission belt 10, initially a sleeve is constructed as shown in block 52. As shown in block 54, the sleeve is ground/polished to produce the individual ribs 44, 46, 48. Thereafter, as shown at block 56, a predetermined amount of the flat particles of inorganic powder 20 is sprayed onto the friction drive surfaces 14a-14f. This takes place while the sleeve is trained around drive and driven rollers and moved in an endless path under tension. Excess particles of the inorganic powder 20 adhering to the exposed portions of the fibers 18 are removed using a brush. At the same time, the remaining flat particles of the inorganic powder 20 are caused to adhere to the exposed rubber on the friction drive surfaces 14a-14f.

By using a dry grinder to effect the grinding/polishing, the ends of the polyamide fibers 18 that project from the friction drive surfaces 14a-14f are caused to have a distinctive flattened and widened area at their ends. The widened ends, as noted above, embrace/hold captive flat particles of the inorganic powder 20 that reside between the ends and the rubber on the friction drive surfaces 14a-14f.

If the projecting length of the polyamide fibers 18 is less than 30 μm, it may be difficult to obtain and maintain the flattened end shape depicted in FIG. 3. As a result, the particles of inorganic powder 20 are more prone to separating from the belt body prematurely, whereby they contribute for a lesser period to noise suppression.

The advantages to using polyamide fibers can be explained best by comparison to other fibers commonly used for reinforcement of rubber layers.

Para-aramid fiber is poly-para-phenylene isophthalamide. With this type of fiber, the normal belt grinding process causes the projecting ends of the fibers to fibrillate. Filaments of the fiber, projecting from the friction drive surfaces on the ribs, become torn in a longitudinal direction and fragmented. The length of each fibrillated projecting part is typically not greater than 0.5 mm. The width of the fibrillated part that projects is normally ½ to ⅛ of the width of each filament embedded in each rib. At least part of the fibrillated elements may curl. The resulting projecting fiber configuration thus makes it ineffective in embracing/capturing any particles adhered to the exposed rubber at the friction drive surfaces between the projecting fibers. Thus, any of the adhered particles are likely to fall off immediately upon operation of the belt, as the friction drive surfaces encounter a cooperating pulley surface.

Meta-aramid fiber is poly-meta-phenylene isophthalamide. Meta-aramid fiber tends to curl as the associated belt body is ground/polished during formation. This shape likewise is not suitable to effectively embrace/capture particles adhered to the exposed friction drive surfaces.

In the event cotton is used, no appreciable projection occurs at the friction drive surfaces. Thus, the cotton reinforcing component contributes little in terms of maintenance of adhered particles to exposed friction drive surfaces.

The flat particles of inorganic powder 20 are preferably obtained by mechanically crushing, processing, and classifying raw stone called talc. The inorganic powder is made primarily from hydrous magnesium silicate with the following properties: a) the specific surface area is within the range of 5,000-25,000 $cm^2/g$ and more preferably 6,000-25,000 $cm^2/g$; b) the apparent density is within the range of 0.25 to 0.65 g/ml, and more preferably 0.30 to 0.65 g/ml; and c) the -oil absorption is not higher than 40 ml/100 g, and more preferably not higher than 38 ml. Other examples of suitable inorganic powder, aside from talc, are mica, clay, and graphite. Amongst all of these, talc is preferred.

When the specific surface area of the flat particles of the inorganic powder 20 is less than 5,000 $cm^2/g$, the particles are sufficiently large that they do not easily adhere to the rubber on the friction drive surfaces. As a result, the frictional coefficient between the belt body and a cooperating pulley is not effectively lowered.

On the other hand, when the specific surface area is greater than 25,000 $cm^2/g$, because the particles have a small area, water may enter the spaces between the accumulated small particles, as a result of which the powder may become sticky. This may detrimentally alter noise suppression capabilities.

Generally, the effect of the solid lubricant increases as apparent density increases. Cohesiveness is lowered while liquidity increases. The apparent density range of 0.25 to 0.65 g/ml is arrived at to optimize cohesiveness and liquidity of the inorganic powder.

The oil absorption range of 40 ml/100 g is preferred for the following reasons. If the oil absorption is small, the particle surfaces are generally smooth so that water does not tend to adhere thereto. Thus, the particles do not tend to become sticky/tacky and good noise suppression results.

If oil absorption is high, the particle surfaces are uneven and tend to retain water. This increases stickiness/tackiness whereby appreciable noise is likely to be generated as the belt is operated.

It is preferred that any impurities that the talc has do not collectively exceed ten weight percent. More preferably, this range is 3-10 weight percent. The impurities may be, for example, iron oxide, aluminum oxide, and magnesium carbonate. Available talc products satisfying this requirement are, for example, LMP-90, DS-34, and SP-38, offered by FUJI TALC INDUSTRIAL CO., LTD. Agricultural talc also is suitable and has the requisite limited impurity content.

If the amount of impurities is small, the talc does not tend to absorb water and become sticky/tacky. With larger amounts of impurities, water absorption increases as does stickiness/tackiness, which may result in noise generation during belt operation.

The compression rubber layer 36 includes a rubber component that is at least one of ethylene-α-olefin rubber, butadiene rubber (BR), styrene-butadiene rubber (SBR), nitrile rubber (NBR), hydrogenated nitrile rubber (H-NBR), chloroprene rubber (CR), butyl rubber (IIR), and natural rubber (NR).

The ethylene-α-olefin elastomer is, for example, either a copolymer of ethylene and α-olefin (propylene, butane, hexane, or octene) or a copolymer of ethylene, α-olefin, and nonconjugated diene. An exemplary diene component is nonconjugated diene of 5 to 15 carbon atoms such as ethylidenenorbornene, dicyclopentadiene, 1,4-hexadiene, cyclooctadiene, and methylene norbornene. Specific examples of the ethylene-α-olefin elastomer are rubbers such as EPM and EPDM.

As a cross-linking agent, it is possible to add an organic peroxide to the rubber composition. Examples of organic peroxide include: dicumyl peroxide; di-t-butyl peroxide; t-butyl cumyl peroxide; benzoyl peroxide; 1,3-bis(t-butylperoxy isopropyl)benzene; 2,5-dimethyl-2,5-di(t-butyl peroxy)hexyne-3,2,5-dimethyl-2,5-(benzoyl peroxy)hexane; and 2,5-dimethyl-2,5-mono(t-butylperoxy)hexane. 0.5-8 parts by weight of the organic peroxide are added, alone or in combination, to 100 parts by weight of the aforesaid elastomer.

Other materials, typically used in the rubber compositions for belts, may be added. As examples, an antidegradant, a stabilizer, a processing aid, and/or a colorant may be added. Any methods known to those skilled in the art may be used for mixing any of the above compositions into the rubber. For example, kneading may be carried out as by using a Banbury mixer and a kneader.

Each load carrying cord 28 is preferably made of at least one of polyester fiber, aramid fiber, glass fiber, or the like. Each cord 28 is subjected to adhesion treatment to improve adherence to the rubber. In a typical adhesion treatment, the fiber is immersed in resorcinol-formaldehyde-latex (RFL liquid), as a result of which an adhesive layer is evenly formed on the cord surface and solidified through drying in a heated environment. Alternatively, treatment with an RFL liquid is carried out after a pre-treatment using an epoxy or an isocyanate compound.

The rubber layer 34 is made from at least one of the following materials: ethylene-α-olefin rubber, butadiene rubber (BR), styrene-butadiene rubber (SBR), nitrile rubber (NBR), hydrogenated nitrile rubber (H-NBR), chloroprene rubber (CR), butyl rubber (IIR), and natural rubber (NR). Preferably, the rubber component in the layer 34 is identical with the rubber component in the aforesaid compression rubber layer 36.

The canvas layer produced by plain-weaving, twill-weaving, or satin-weaving a material such as cotton, polyester fiber, aramid fiber, nylon fiber, or the like. The canvas 50 is preferably a rubber-containing canvas coated with a rubber composition, after being subjected to RFL treatment.

In the sleeve as shown at block 52 in FIG. 4, a canvas layer 50 is wrapped around a cylindrical drum (not shown). A rubber sheet defining at least part of the rubber layer 34 is wrapped around the canvas layer 50. The load carrying cord (s) 28 is then spirally wrapped around the sheet defining the rubber layer 34. A rubber sheet defining the rubber layer 36 is then wrapped to produce the completed sleeve which is vulcanized in a drum (not shown).

The vulcanized sleeve is then wrapped around drive and driven rollers (not shown) and driven in an endless path. As the vulcanized sleeve is driven, a cutting wheel is brought into contact with the compression section 32. The cutting wheel has a shape that is complementary to the desired end shape for the ribs 44, 46, 48. Thereafter, the sleeve is cut to predetermined widths to produce individual belts 10 that are turned inside out to complete the process.

The schematic depiction of the belt 10 in FIG. 1 is intended to encompass, among other belt constructions, a cut-edge V-belt. This type of belt has similar components to the belt 10 shown in FIGS. 2 and 3, with the exception that the corresponding body has a single V-shaped rib. A rubber-containing canvas may be applied to the inside and/or outside of such a belt.

The schematic showing in the FIG. 1 is also intended to encompass other V-ribbed belt arrangements. As an alternative to the V-ribbed construction shown, a V-ribbed belt may be made without a corresponding cord supporting rubber layer 34. A back side rubber layer may be provided in place of the canvas layer 50 so that rubber is exposed on the outside of the belt.

The effectiveness of the exemplary V-ribbed belt, made according to the present invention, will now be described with respect to comparative testing.

INVENTIVE EXAMPLES 1-4 AND COMPARATIVE EXAMPLES 1-3

A cylindrical mold was wrapped with a single ply of rubber-containing canvas in which rubber was rubbed onto a plain weave fabric woven from cotton warp and weft. The resulting rubber-containing canvas was wrapped with a cord supporting rubber sheet/layer (adhesive rubber sheet) made from an EPDM composition produced by removing the short staple fibers from the EPDM composition of Table 1, below.

TABLE 1

| | | |
|---|---|---|
| Polymer Mitsui EPT3070 | 100 | (parts by weight) |
| Short Staple Fiber (Nylon 6,6) | 25 | |
| HAF Carbon Black | 45 | |
| GPF Carbon Black | 20 | |
| Zinc Oxide | 5 | |
| Stearic Acid | 1 | |
| Paraffin Oil | 10 | |
| Dicumylperoxide | 2 | |
| p,p'-dibenzothiazyl quinonedioxime | 2.5 | |

A polyester fiber cord was then wrapped therearound. Formation was completed by wrapping a compression rubber sheet/layer made from the EPDM composition of Table 1. The compression rubber sheet/layer and cord supporting sheet/layer were produced by rolling materials through a calender roll after the materials were kneaded using a Banbury mixer.

The resulting sleeve was vulcanized for thirty minutes at 150° C. using a known technique. The resulting vulcanized rubber sleeve was trained around drive and driven rollers on a polishing/grinding system. The rubber sleeve was driven in an endless path under a predetermined tension. A polishing wheel, with a surface upon which 150-mesh diamond was attached, was rotated at 1600 rpm and contacted with the vulcanized sleeve to effect polishing thereof.

After being removed from the above polishing/grinding system, the vulcanized sleeve was trained around separate drive and driven rollers. With the sleeve tensioned and moving in an endless path, a predetermined amount of talc was sprayed onto the exposed friction drive surfaces. Excess talc adhering to the projecting short staple fibers was removed using a brush. Through this process, the talc was also caused to adhere to the exposed rubber portions of the friction drive surfaces between the projecting short fibers.

The resultant sleeve was then set up on a cutter, whereupon the sleeve was cut to predetermined widths, while being rotated, to complete the belt formation process.

In the resulting belts, the load carrying cords were embedded in a cord supporting rubber layer. A single ply of rubber-containing cotton canvas was placed on the outer surface of the body defined by the supporting layer for the cords. The compression rubber layer, inside of the cord supporting layer, had embedded short staple fibers aligned in a widthwise direction. The belt body had three ribs extending continuously in a lengthwise direction. This V-ribbed belt was a K-type, 3-ribbed belt in conformity to RMA, with an 1100 mm length. The rib pitch, rib height, and rib angle of the belt were 3.56 mm, 2.9 mm, and 40°, successively.

With this belt, a friction test and a misalignment noise test were carried out. The nature of the tests and results are identified below.

Friction Test

The friction test was carried out as follows. A V-ribbed belt was fit to a guide roller with a 60 mm outer diameter so that the belt was in contact with the roller through 90 degrees along the outer surface thereof. One end of the V-ribbed belt was fixed, with the other end supporting a weight of 1.75 kgf/3 ribs. With this arrangement the guide roller was rotated at 43 rpm and values generated by a load call were detected. From these values, a tight-side tension T1 and a loose-side tension T2 were detected. Based upon the tension ratio (T1/T2) a frictional coefficient $\mu=(1/2\pi)\ln(T1/T2)$ was calculated. The friction test was carried out both in dry and wet conditions, with the latter resulting from water being fed at 60 cc/min. The results are indicated in Table 2, below.

TABLE 2

| | Inventive Examples | | | | Comparative Examples | | |
|---|---|---|---|---|---|---|---|
| | 1 | 2 | 3 | 4 | 1 | 2 | 3 |
| Talc | LPM-90 | DS-34 | SP-38 | Agricultural talc | Not used | LSM-100 | LMK-100 |
| Specific surface area (cm2/g) | 25,000 | 12,000 | 7,000 | 6,000 | — | 30,000 | 35,000 |

TABLE 2-continued

|  | Inventive Examples | | | | Comparative Examples | | |
| --- | --- | --- | --- | --- | --- | --- | --- |
|  | 1 | 2 | 3 | 4 | 1 | 2 | 3 |
| Apparent density (g/ml) | 0.30 | 0.45 | 0.55 | 0.65 | — | 0.23 | 0.19 |
| Oil absorption (ml/100 g) | 38 | 29 | 24 | 23 | — | 43 | 46 |
| TS frictional coefficient | | | | | | | |
| Dry | 1.20 | 1.15 | 1.05 | 1.12 | 1.33 | 1.15 | 1.20 |
| Wet | 0.85 | 0.78 | 0.80 | 0.75 | 0.69 | 0.96 | 0.95 |
| Misalignment noise test (with misalignment angle of 1.7°) | | | | | | | |
| Dry | 5 | 5 | 5 | 4 | 3 | 5 | 5 |
| Wet | 4 | 4 | 5 | 5 | 1 | 2 | 2 |

Misalignment Noise Test

The evaluating test machine had a drive pulley with a 120 mm diameter, a driven pulley with a 120 mm diameter, and a tensioning pulley with a 70 mm diameter. Misalignment between the drive and driven pulleys was set to 1.7°. The V-ribbed belts were fit to the pulleys and noise level was evaluated with the belt being driven under the following conditions. At room temperature, the drive pulley was loaded so that the drive pulley rotated at 1000 rpm, with the belt tension 6 kgf/rib, with the driven pulley loaded at 2.1 Nm/rib. The noise level was identified using the following characterizations.

5: Not audible at all
4: Audible by stethoscope
3: Slightly audible
2: Audible
1: Clearly audible The noise level "5" identified the lowest noise level. Noise levels of 3 or higher were considered not to be annoying. The results of this test are shown in Table 2.

Talc types of LPM-90, DS-34, SP-38, LSM-100, and LMK-100 were all manufactured by FUJI TALC INDUSTRIAL CO., LTD. The agricultural talc was manufactured by TAKEHARA KAGAKU KOGYO CO., LTD.

Table 2 shows that for Inventive Examples 1-3, the frictional coefficient in the dry condition was lower than that for Comparative Example 1, in which no talc was applied. The frictional coefficient in the wet condition for Inventive Examples 1-3 was higher than that for Comparative Example 1. Additionally, no noise was generated in the misalignment noise test for Inventive Examples 1-3. On the other hand, for Comparative Example 2, noise was generated in the wet condition because the specific area of the talc was large. Noise was also generated in the wet condition for Comparative Example 3 because a specific surface area of the talc was large. It is believed that talc with a large specific area tends to fall off from the rubber while the belt is driven, and thus the lubricating effect is minimized.

INVENTIVE EXAMPLES 5 AND 6 AND COMPARATIVE EXAMPLES 4-6

In constructing the V-ribbed belts for this testing, steps similar to those described above were carried out. More specifically, a cylindrical mold was wrapped with a single ply of rubber, containing canvas in which rubber was rubbed onto a plain weave fabric woven from cotton warp and weft. A cord supporting rubber layer/sheet was then wrapped around the rubber-containing canvas. The rubber sheet was made from an EPDM composition produced by removing short staple fibers from the EPDM composition of Table 1. A polyester fiber cord was then spirally wrapped. The sleeve formation was completed by applying a compression rubber sheet/layer made of the EPDM composition of Table 1, with the exception that the type and amount of short staple fibers were changed from 25 parts by weight of nylon 6,6 to those of the composition shown in Table 3, below.

TABLE 3

|  | Inventive Examples | | | Comparative Examples | | |
| --- | --- | --- | --- | --- | --- | --- |
|  | 3 | 5 | 6 | 4 | 5 | 6 |
| Nylon 6,6 | 25 | 15 | 15 | 10 | — | 25 |
| Cotton | — | 10 | — | 15 | — | — |
| m-aramid short staple fiber | — | — | 5 | — | 15 | — |
| Projecting length of short staple fiber (μm) | | | 60-90 | | | 15-25 |
| Misalignment noise test (misalignment angle of 1.7°) | | | | | | |
| Dry condition | 5 | 5 | 5 | 4 | 5 | 4 |
| Wet condition | 5 | 4 | 4 | 2 | 3 | 3 |
| After 100 hours of degeneration driving | | | | | | |
| Dry condition | 4 | 4 | 4 | 3 | 4 | 3 |
| Wet condition | 4 | 3 | 4 | 1 | 2 | 2 |

The resulting sleeve was vulcanized for thirty minutes at 150° C. using known techniques.

The compression rubber sheet/layer and the cord supporting rubber layer/sheet were produced by rolling the materials using a calendar roll after these materials were kneaded using a Banbury mixer. For Inventive Example 5, the short staple fibers mixed into the compression rubber sheet were, in place of the 25 parts by weight of nylon 6,6, a mixture of 15 parts by weight of nylon 6,6 and 10 parts by weight of cotton. For Inventive Example 5, short staple fibers were added to the compression rubber sheet/layer as a mixture of 15 parts by weight of nylon 6,6 and five parts by weight of m-aramid fiber. The vulcanized sleeve was trained around drive and driven rollers of a polishing system in the same manner as described above for Inventive Example 1. The belt sleeve was placed under tension and driven continuously in an endless path. The polishing wheel, with a surface upon which 150 mesh diamond was attached, was rotated at 1600 rpm and brought into contact with the vulcanized sleeve to effect polishing.

The sleeve was separated from the polisher rollers and was trained around a separate drive roller and driven roller. The sleeve was placed under tension and driven in an endless path. Talc was sprayed onto the friction drive surfaces of the ribs. The amount of the sprayed talc was identical to that for Inventive Example 3. Excessive talc adhering to the projecting fibers was removed by a brush which at the same time caused the talc particles to adhere to the exposed rubber on the friction drive surfaces between where the fibers projected. The sleeve was then set up on a cutter system through which it was cut to individual belt widths as the belt sleeve was driven.

As with the cords of Inventive Example 1, the cords were embedded in a supporting rubber layer. A single ply of rubber-containing cotton canvas was placed on the cord supporting rubber layer. Inside the cord supporting rubber layer, a compression rubber layer was attached with short staple fibers aligned with their lengths directed widthwise of the belt body. The belt body had three identical ribs extending endlessly lengthwise of the belt body. The V-ribbed belt was a K-type, 3-rib belt in conformity to RMA and with an 1100 mm length. The rib pitch, rib height, and rib angle for the belt were 3.56 mm, 2.9 mm, and 40°, successively.

Using this V-ribbed belt, a misalignment noise test and a driving degradation test, as described below, were carried out, with the results shown in Table 3.

Driving Degradation Test

The driving degradation test was performed on a system with a drive pulley having a 120 mm diameter, an idler pulley having an 85 mm diameter, a driven pulley having a 120 mm diameter, and a tensioning pulley having a 45 mm diameter. The belts were trained around the pulleys. The conditions were as follows. The V-ribbed belts contacted the outer surface of the tensioning pulley through 90 degrees and contacted the outer surface of the idler pulley through 120 degrees. Drive and driven pulleys were loaded with 12 PS. Atmospheric temperature was 120° C. The drive pulley was rotated at 4900 rpm, with the belt tension at 40 kgf/3 ribs. Under these conditions, the belts were driven for ten hours so as to be degenerated. After this test was conducted, the belts were subjected to the above-described misalignment noise test.

As shown in Table 3, nylon 6,6, cotton, and m-aramid short staple fibers were mixed in Inventive Examples 3, 5 and 6. The proportions of the nylon 6,6 were fifty percent of the total amount of the short staple fibers. The projecting length of the fibers was sufficient. The anti-noise property was thus sufficient even after the degeneration.

On the other hand, since the amount of nylon 6,6 short staple fibers was small in Comparative Example 4, and no nylon was included in Comparative Example 5, in these comparative examples, the anti-noise property was lowered after the degeneration. In Comparative Example 6, the anti-noise property was low, particularly after degeneration, because the projecting length of the nylon 6,6 short fiber was excessively short.

Generally, the above-described beneficial effects of solid lubricant may be achieved, even in the presence of water, if the specific surface area, apparent density, oil absorption, and controlled impurity content in the particles of the inorganic powder are maintained within ranges set forth above.

The foregoing disclosure of specific embodiments is intended to be illustrative of the broad concepts comprehended by the invention.

The invention claimed is:

1. A power transmission belt comprising:
a body with a length, an inside, an outside, and laterally oppositely facing side surfaces,
the body comprising at least one embedded load carrying member,
the at least one load carrying member extending lengthwise of the body,
wherein the body comprises a rubber layer defining at least a part of at least one friction drive surface,
wherein short reinforcing fibers are embedded in the rubber layer in an amount of 15-50 parts by weight of the short reinforcing fibers per 100 parts by weight of rubber in the rubber layer,
wherein the short reinforcing fibers comprise polyimide short reinforcing fibers,
wherein the polyamide short reinforcing fibers make up at least 50 weight percent of the short reinforcing fibers embedded in the rubber layer,
wherein a plurality of the polyamide short reinforcing fibers project from the at least part of the at least one friction drive surface and have exposed ends that are flattened,
wherein flat particles of inorganic powder with a specific surface area of 5,000-25,000 cm$^2$/g are adhered to the at least part of the at least one friction drive surface at locations on the at least part of the at least one friction drive surface at which the short reinforcing fibers do not project.

2. The power transmission belt according to claim 1 wherein the body has a compression section and a tension section and the rubber layer defines at least a part of the compression section.

3. The power transmission belt according to claim 2 wherein the at least one friction drive surface comprises separate friction drive surfaces at the laterally oppositely facing side surfaces on the body.

4. The power transmission belt according to claim 3 wherein the polyamide short reinforcing, fibers project from the friction drive surfaces a distance of at least 30 µm.

5. The power transmission belt according to claim 3 wherein the flat particles of inorganic powder have an apparent density of between 0.25 and 0.65 g/ml.

6. The power transmission belt according to claim 3 wherein the flat particles of inorganic powder have an oil absorption of not more than 40 ml/100 g.

7. The power transmission belt according to claim 5 wherein the flat particles of inorganic powder have an oil absorption of not more than 40 ml/100 g.

8. The power transmission belt according to claim 3 wherein the flat particles of inorganic powder are made of talc and are captive between the flattened ends of the polyamide short reinforcing fibers and the locations on the at least part of the at least one friction drive surface at which the short reinforcing fibers do not project.

9. The power transmission belt according to claim 4 wherein the flat particles of inorganic powder are made of talc.

10. The power transmission belt according to claim 5 wherein the flat particles of inorganic powder are made of talc.

11. The power transmission belt according to claim 6 wherein the flat particles of inorganic powder are made of talc.

12. The power transmission belt according to claim 7 wherein the flat particles of inorganic powder are made of talc.

13. The power transmission belt according to claim 8 wherein the talc does not have impurities comprising at least any of: a) iron oxide; b) aluminum oxide; and c) magnesium carbonate that collectively exceed 10 weight percent.

14. The power transmission belt according to claim 3 wherein the power transmission belt is a V-ribbed belt.

15. The power transmission belt according to claim 3 wherein the short reinforcing fibers further comprise at least one of cotton and aramid fibers.

16. The power transmission belt according to claim 4 wherein the polyamide short reinforcing fibers project from the friction drive surface a distance of 60-90 μm.

17. The power transmission belt according to claim 3 wherein the friction drive surfaces defined by the rubber layer each has an area and the inorganic powder covers from 40-90% of the areas of the friction drive surfaces defined by the rubber layer.

18. The power transmission belt according to claim 3 wherein the polyamide short reinforcing fibers make up from 75 to 100 weight percent of the short reinforcing fibers.

19. A power transmission belt comprising:
a body with a length, an inside, an outside, and laterally oppositely facing side surfaces,
the body comprising a rubber layer defining spaced friction drive surfaces at the laterally oppositely facing side surfaces,
wherein short reinforcing fibers are embedded in the rubber layer in an amount of 15-50 parts by weight of the short reinforcing fibers per 100 parts by weight of rubber in the rubber layer,
wherein the short reinforcing fibers comprise polyamide short reinforcing fibers that make up least 50 weight percent of the short reinforcing fibers embedded in the rubber layer,
wherein a plurality of the polyamide short reinforcing fibers project from the friction drive surfaces and have exposed ends that are flattened,
wherein flat particles of inorganic powder are adhered to the friction drive surfaces at locations on the friction drive surfaces at which the short reinforcing fibers do not project to reside captively between the flattened ends of the polyamide short reinforcing fibers and the locations on the friction drive surfaces at which the short reinforcing fibers do not project,
wherein the adhered flat particles of inorganic powder have a specific surface area of 5,000-25,000 $cm^2/g$.

* * * * *

UNITED STATES PATENT AND TRADEMARK OFFICE
CERTIFICATE OF CORRECTION

| | | |
|---|---|---|
| PATENT NO. | : 8,235,852 B2 | |
| APPLICATION NO. | : 12/384575 | |
| DATED | : August 7, 2012 | |
| INVENTOR(S) | : Yorifumi Hineno, Takayuki Utsumi and Takeshi Nishiyama | |

It is certified that error appears in the above-identified patent and that said Letters Patent is hereby corrected as shown below:

Column 12, lines 18-19, should read as follows:

wherein the short reinforcing fibers comprise polyamide
        short reinforcing fibers, Signed and Sealed this
Twenty-third Day of October, 2012

David J. Kappos
*Director of the United States Patent and Trademark Office*